MARTHA E. SLOCUM.
Plant-Protector.
No. 163,417.    Patented May 18, 1875.
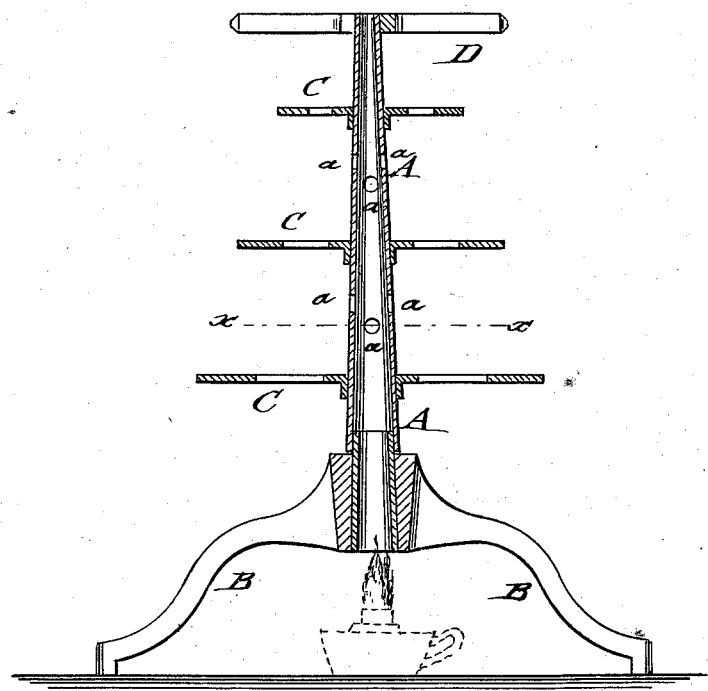
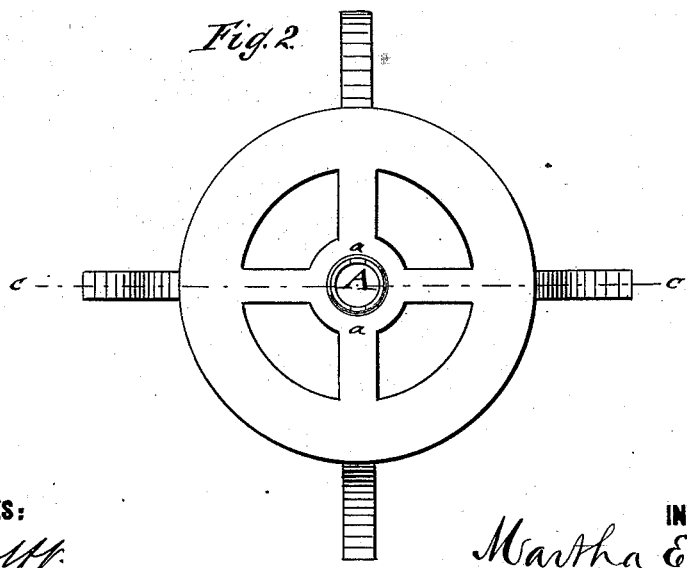
WITNESSES:    INVENTOR:
E. Wolff    Martha E. Slocum
A. F. Terry    BY
    ATTORNEYS.

UNITED STATES PATENT OFFICE.

MARTHA E. SLOCUM, OF HORNELLSVILLE, NEW YORK.

IMPROVEMENT IN PLANT-PROTECTORS.

Specification forming part of Letters Patent No. 163,417, dated May 18, 1875; application filed April 24, 1875.

*To all whom it may concern:*

Be it known that I, Mrs. MARTHA E. SLOCUM, of Hornellsville, in the county of Steuben and State of New York, have invented a new and Improved Plant-Protector, of which the following is a specification:

In the accompanying drawing, Figure 1 represents a vertical central section on the line *c c*, Fig. 2, of my improved plant-protector, and Fig. 2 a horizontal section of the same on the line *x x*, Fig. 1.

Similar letters of reference indicate corresponding parts.

The object of my invention is to provide a device by which flowers and other plants may be protected in a cheap and effective manner against freezing in cold weather; and the invention consists of a hollow tapering standard placed on legs with side openings and shelves at different heights on which the plants are placed to be heated by a lamp under the standard. A top cross-piece supports a covering thrown over the whole to prevent escape of heat and moisture.

In the drawing, A represents the hollow and tapering standard of my improved device for protecting plants during cold weather. The standard A is secured to legs B of such height that a lamp may be placed below the bottom opening for heating up the standard. The heat issues by side holes *a* of the standard at different heights to shelves C of various diameter attached thereto at suitable distance from each other to support the flower-pots, and other plants placed thereon for being heated up. A top cross-piece, D, serves to support a flower-basket or other larger flower-case placed thereon. It also serves for throwing a covering over the plants on the shelves and keep thereby the heat and moisture more effectually around the plants. The plants may, in this manner, be fully protected against freezing during cold weather in a very reliable and economical manner.

Having thus described my invention, I claim as new, and desire to secure by Letters Patent—

A device for protecting plants against freezing, composed of a hollow tapering standard with heat-issuing apertures, plant-supporting shelves, and top cross-piece, the whole arranged and applied, substantially as and for the purpose set forth.

MRS. MARTHA E. SLOCUM.

Witnesses:
  D. M. HURLBURT,
  Mrs. D. M. HURLBURT.